Figure 1:
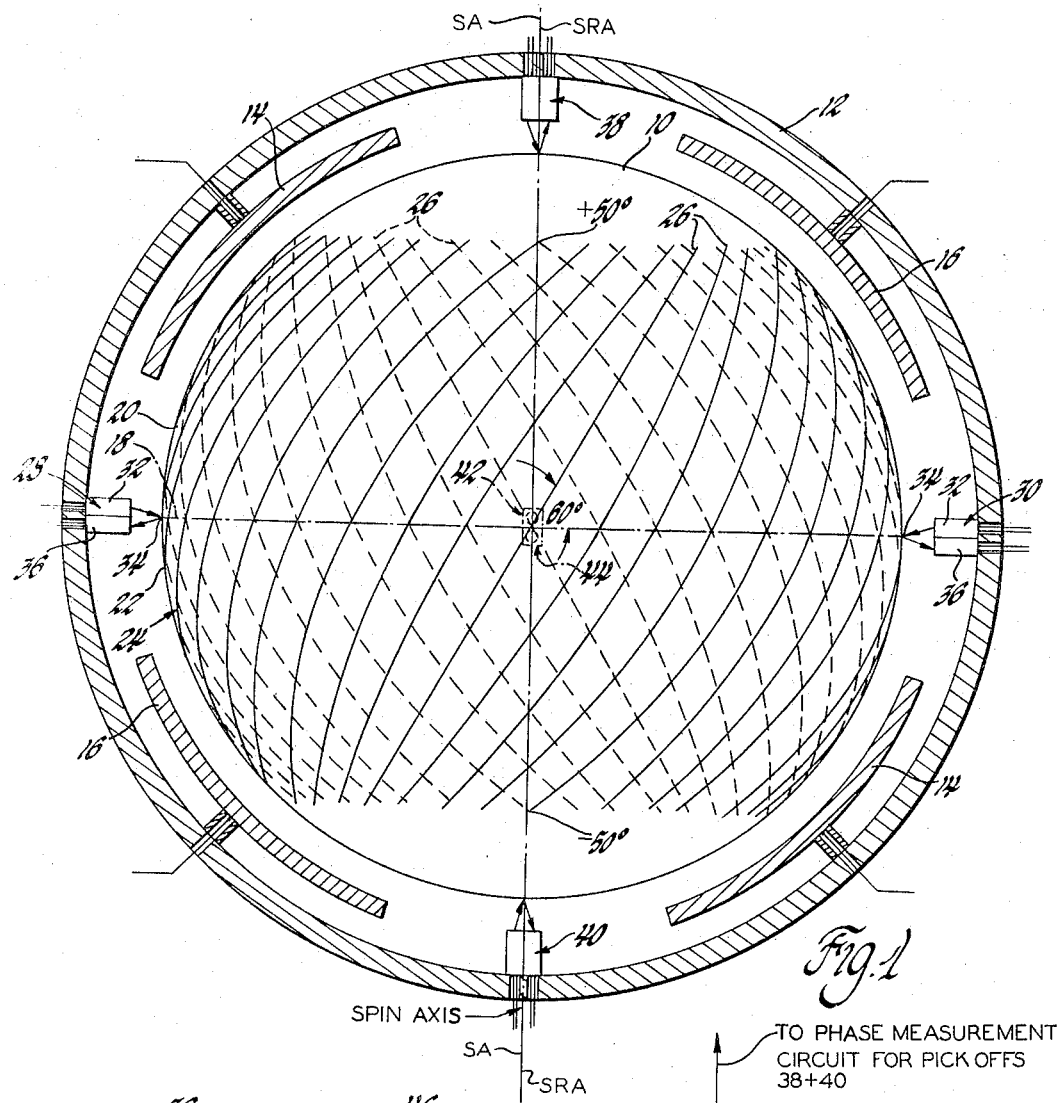

April 11, 1967    A. T. NORDSIECK    3,313,161
MEANS FOR MEASURING RELATIVE ANGULAR DISPLACEMENTS OF A ROTOR
Filed June 14, 1963

INVENTOR.
Arnold T. Nordsieck
BY
E. W. Chiasten
ATTORNEY

United States Patent Office 3,313,161
Patented Apr. 11, 1967

3,313,161
MEANS FOR MEASURING RELATIVE ANGULAR DISPLACEMENTS OF A ROTOR
Arnold T. Nordsieck, Santa Barbara, Calif., assignor to General Motors Corporation, Detroit, Mich., a corporation of Delaware
Filed June 14, 1963, Ser. No. 287,830
7 Claims. (Cl. 74—5.6)

This invention relates to means for measuring relative angular displacements of the spin axis of a rotor with respect to a spin reference axis and more particularly to such measuring means utilizing a unique intelligence transmitting means.

One form of the prior art for measuring relative angular displacements between a rotor and a support comprises a spherically shaped gyro rotor rotatably supported by a support for rotation about its spin axis. A pattern is provided on the spherical surface of the rotor comprising alternately light reflecting and non-light reflecting areas. Means are provided for applying light to the surface of the rotor and optical pick-off means are provided for developing output signals proportional to the intensity of light received. The pattern on the rotor is such that the time duration of light received by the pick-offs varies as a function of latitude thereby giving an indication of relative angular displacement between the rotor and the support. However, since it is the time duration of light received that is indicative of relative angular displacement it is required for correct measurements that the rotor spin at a constant angular velocity.

In accordance with this invention, means are provided for measuring changes in the attitude of a rotor relative to a support wherein the intelligence received is not dependent on the angular velocity of the rotor. This is accomplished with a support rotatably supporting a substantially spherical rotor having intelligence transmitting means on the surface thereof including a transmitting area and a non-transmitting area each being askew of the spin axis. A pair of pick-offs are so located that when the rotor rotates in a given direction and its spin axis is coincident with a spin reference axis defined by the support, the output signals from the pick-offs will be displaced in phase by a known angle. However, upon relative angular displacements of the spin axis with respect to the spin reference axis the output signals from the pick-offs will be displaced in phase by an amount different from the known angle as determined by the amount of the relative angular displacement. In addition, suitable means are connected with the pick-offs for measuring the phase displacement between the output signals from the pick-offs and relating it to the relative angular displacement of the spin axis with respect to the spin reference axis.

Figure 2:
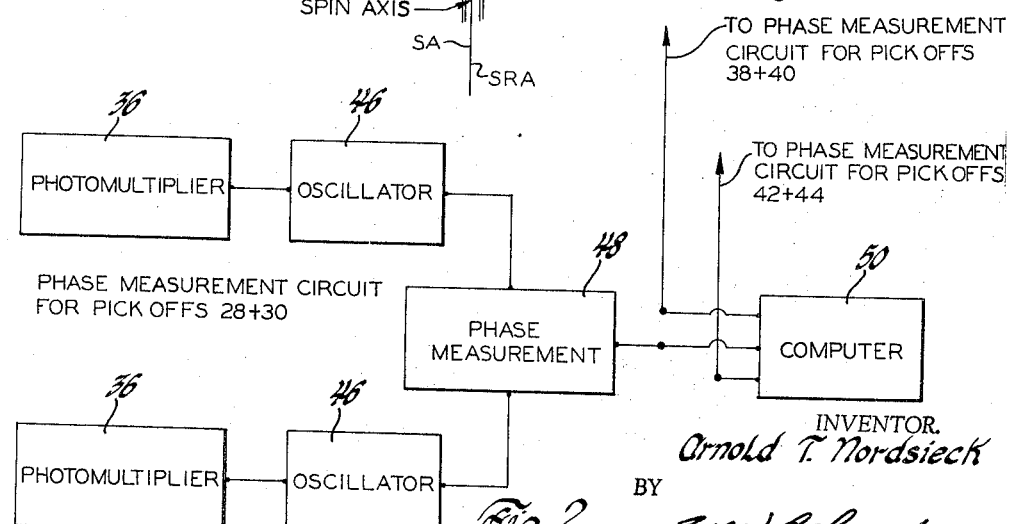

A more complete understanding of this invention may be had from the detailed description which follows taken with the accompanying drawing in which:

FIGURE 1 is a diagrammatic representation partly in section of one embodiment of the invention; and FIGURE 2 is a block diagram illustrating circuit means which may be used in conjunction with the invention.

Referring now to the drawing and more particularly to FIGURE 1, there is shown a free gyroscope comprising a non-magnetic stainless steel spherical rotor 10 universally supported inside a hollow spherical support 12 by an electrostatic suspension system utilizing two pairs of electrodes 14 and 16 and a third pair, not shown, with the electrodes of each pair being located diametrically opposite each other with respect to the support 12. The rotor 10 will rotate about a spin axis SA extending through its center under the influence of suitable impelling means, not shown. The support 12 defines a spin reference axis SRA extending through the center of the support and with respect to which relative angular displacements of the spin axis SA of the rotor 10 are measured in accordance with this invention.

The rotor 10 is bisected by an equatorial plane 18, shown by the dashed line in FIGURE 1, perpendicular to the spin axis SA defining Northern and Southern hemispheres 20 and 22, respectively. The spherical surface of rotor 10 is preferably a uniform light reflecting surface prior to the application thereon of an optical pattern 24. The optical pattern 24 comprises an even number of non-intersecting non-light reflecting areas or lines 26. Each line 26 is characterized by being of uniform width through its length and defining an arc of a great circle on the rotor's spherical surface. The arc defined by each line 26 extends from approximately —50° latitude in the Southern hemisphere 22 to approximately +50° latitude in the Northern hemisphere 20. Furthermore, the arc defined by each line 26 is inclined at approximately 60° to the equator defined by the intersection of the equatorial plane 18 and the spherical surface of the rotor 10. The lines 26 are spaced equally from each other longitudinally about the surface of the rotor 10.

The optical pattern 24 may be regularly and precisely applied to the surface of the rotor 10 by chucking the rotor in a spindle of a suitable dividing head with the spin axis SA of the rotor along the spindle axis and by swinging a marking tool in a circular arc about a second axis inclined at 60° to the spindle axis. The dividing head determines the longitudinal spacing of the lines. An advantageous form of marking tool consists of a very small diameter nozzle from which a jet of abrasive powder is projected normally onto the surface to be marked.

An optical monitoring or pick-off system is provided for applying light to the spherical surface of the rotor 10 and receiving light reflected therefrom in a manner to receive intelligence from the optical pattern 24. The system comprises three pairs of opposing pick-offs mounted on the support 12; the first pair comprising pick-offs 28 and 30, the second pair comprising pick-offs 38 and 40 and the third pair comprising pick-offs 42 and 44. Each pick-off includes a light source 32 and suitable focussing elements (not shown) to produce a concentration of illumination on the surface of the rotor 10 at a point of attention or circular focal spot 34, the diameter of which is chosen approximately equal to the width of each line 26. As shown in FIGURE 1, the three pairs of pick-offs define three mutually perpendicular axes. However, it is to be understood that the physical locations of the pick-offs could differ from that as shown in FIGURE 1 so long as their effective locations define three mutually perpendicular axes, i.e. that their points of attention or focal spots 34 on the surface of the rotor 10 define three mutually perpendicular axes. Preferably, the effective locations or focal spots 34 of each pair of pick-offs 28 and 30 and 42 and 44 are respectively located diametrically opposite each other with respect to the spin reference axis SRA and define a plane perpendicular to the reference axis SRA. Furthermore, the effective locations or focal spots 34 of pick-offs 38 and 40 define an axis coincident with the spin reference axis SRA.

Each pick-off includes a photomultiplier 36 which is also focussed at the focal spot 34. Thus light from the light source 32 is reflected from the surface of the rotor 10 at the focal spot 34 to the photomultiplier 36 to develop an output signal indicative of the intensity of light received. With the rotor 10 rotating about its spin axis SA in a given direction each focal spot 34 is alternately located on light reflecting and non-light reflecting lines, and hence each photomultiplier 36 develops output signal pulses, the time duration of each pulse being determined by the angular velocity of the rotor 10.

In accordance with this invention, relative angular displacements of the spin axis SA of the rotor 10 with respect to the spin reference axis SRA are measured without regard to the angular velocity of the rotor 10. This is accomplished by measuring the phase relationship of the output signals of the photomultipliers 36. It is apparent that as the rotor 10 rotates about its spin axis SA each photomultiplier 36 produces a train of output signal pulses. When the spin axis SA is coincident with the spin reference axis SRA and the focal spot 34 of pick-off 28 is on one of the lines 26, the focal spot 34 of pick-off 30 is also on a line 26, whereby the photomultipliers 36 of the pick-offs 28 and 30 produce output signal pulses which are coincident in phase. However, when the spin reference axis SRA and the spin axis SA are not coincident, the output signal pulses from the photomultipliers 36 is displaced in phase. The phase displacement is a function of the latitude at which the focal spots of diametrically opposed pick-offs are located on the rotor 10.

A precise measurement of relative phase displacement between the train of output signal pulses developed by each photomultiplier 36 of opposed pick-offs is obtained by connecting the output of each photomultiplier with a constant amplitude sinusoidal oscillator 46 operating at a frequency equal to that of the signal pulses. The output of each oscillator 46 is connected to a suitable phase measurement device 48 which measures the phase relationship of the output signals of oscillators 46 to a small fraction of a degree. A computer 50 is connected with the output of each phase measurement device 48 and is operative to relate the phase differences between the output signals of oscillators 46 connected with each device 48 to relative angular displacements on the spin axis SA with respect to the spin reference axis SRA.

The operation of the measuring means may be more readily understood from the following description. If it is assumed that the rotor 10 is spinning clockwise about its spin axis SA as viewed from the Southern hemishpere 22, and that the spin axis SA is coincident with the spin reference axis SRA, it is seen that the portion of each line 26 in the Northern hemisphere 20 is leading the portion of that line in the Southern hemisphere 22. Since the pick-offs 28 and 30 are focussed on focal spots 34 located at the same latitude on the surface of the rotor 10, the output signal pulses developed by the photomultipliers 36 of the pick-offs 28 and 30 are coincident in phase. The rotor 10 continues to spin about its spin axis SA in a plane to maintain a fixed attitude in space. However, if the support member 12 is now angularly displaced with respect to the rotor 10 due to some external force acting thereon, the spin axis SA is no longer coincident with the spin reference axis SRA. Hence, the respective focal spots 34 of the pick-offs 28 and 30 are displaced equally in latitude in opposite directions with respect to the equatorial plane 18 whereby the output signals from the respective photomultipliers 36 of the pick-offs 28 and 30 are displaced in phase. For example, in FIGURE 1, if the support 12 is angularly displaced about the axis defined by pick-offs 42 and 44 in a counterclockwise direction by 30°, then the focal spot 34 of pick-off 30 is at +30° latitude in the Northern hemisphere 20 and the focal spot of pick-off 28 is at −30° in the Southern hemisphere 22. Since the portion of each line 26 in the Northern hemisphere 20 leads the portion of that line in the Southern hemisphere 22, the output signal pulses developed by the photomultiplier 36 of the pick-off 30 leads those from the photomultiplier 36 of the pick-off 28. Thus, since each line 26 defines an arc of a great circle on the surface of the rotor 10 inclined at 60° with respect to the equatorial plane 18, the phase displacement between the two trains of output signals is a function of the cosine of 60° and of the latitude, i.e. 30°. The output signal pulses developed by each photomultiplier 36 of the pick-offs 28 and 30 determine the phase of the output signals of the constant amplitude sinusoidal oscillator 46 operating at the pulse frequency, and hence the phase difference between output signal pulses of pick-offs 28 and 30 is measured with the phase measurement means 48. The output signals of the phase measurement means 48 are applied to the computer 50 which relates phase relationship to relative angular displacements of the spin reference axis SRA with respect to the spin axis SA.

The operation described above has been given with respect to an angular displacement of the support 12 about the axis defined by the pick-offs 42 and 44. It is apparent that the support 12 might also at the same time be angularly displaced about the axis defined by the pick-offs 28 and 30 as is common in a free gyroscope. In such a case, a phase displacement also occurs between the output signal pulses developed by the respective photomultipliers 36 of the pick-offs 42 and 44 which are also applied to the computer 50 in the manner as has been described in conjunction with the pick-offs 28 and 30. The third pair of pick-offs 38 and 40 are operative to develop output signals only when the relative angular displacement between the spin reference axis SRA and the spin axis SA exceeds 40°. Each of the pick-offs 38 and 40 also includes a photomultiplier 36 connected with the computer 50 in the manner as described above. Thus, with three pairs of pick-offs defining three mutually perpendicular axes, at least two pairs of pick-offs have their focal spots 34 on the optical pattern 24 of the rotor 10. Furthermore, if one of the four pick-offs having its focal spot 34 on the pattern 24 is rendered inoperative, the information obtained from the other three pick-offs is sufficient when fed through suitable computer means to obtain the missing information which would have been supplied by the inoperative pick-off.

It is apparent that the greater the number of lines 26 used for the optical pattern 24 the greater is the pulse frequency of the oscillators 46 and hence the more accurate is the measurement of angular displacement between the spin axis SA and the spin reference axis SRA. However, with such a large number of lines 26, an ambiguity in the phase difference between the output signals of each pair of oscillators 46 is present. This ambiguity is due to the fact that while the mechanical displacement between each pair of pick-offs is 180° the electrical phase displacement is a multiple of the number of lines 26. Since changes in electrical phase displacement as well as changes in relative angular displacement between the spin reference axis SRA and the spin axis SA must be a smooth continuous function of time, the ambiguity may be resolved with suitable means within the computer 50. It is not an object of this invention to detail the resolving means, but is merely mentioned here to point out that some means should be provided to resolve the ambiguity.

Although the description of this invention has been given with respect to a particular embodiment, it is not to be construed in a limiting sense. Numerous variations and modifications within the spirit and scope of the invention will now occur to those skilled in the art. For a definition of the invention, reference is made to the appended claims.

I claim:

1. Means for measuring relative angular displacements of the spin axis of a rotor with respect to a spin reference axis and comprising a rotor support member defining a spin reference axis, a rotor supported for rotation about its spin axis by the support member, the rotor having an annular surface coaxial with its spin axis, intelligence transmitting means on the circular periphery of the rotor including a transmitting area and a non-transmitting area each being askew of the spin axis, a pair of pick-offs mounted on the support member each being responsive to intelligence transmitted from the transmitting area and operative to develop an output signal each time it receives intelligence therefrom, and the effective locations of the pick-offs being angularly displaced by a known angle with respect to the spin reference axis and located in a plane perpendicular to the spin reference axis whereby when the rotor rotates about its spin axis in a given direction and the spin axis is coincident with the spin reference axis the output signals from the pick-offs will be displaced in phase by the known angle and upon relative angular displacement of the spin axis with respect to the spin reference axis the output signals from the pick-offs will be displaced in phase by an amount different from the known angle as determined by the amount of angular displacement between the spin axis and the spin reference axis and means connected to the pickoffs for measuring the phase displacement between the output signals.

2. In a gyroscopic apparatus, means for measuring relative angular displacements of the spin axis of a gyro rotor with respect to a spin reference axis and comprising a support member defining a spin reference axis, a spherical rotor rotatably supported by the support member and having a spin axis, the rotor surface including a plurality of great circle lines, the lines and the areas therebetween having different signal reflective properties with the lines being located at identical oblique angles to the rotor equator and equally spaced thereon, a pair of spaced signal producing means mounted on the support member, a pair of signal pick-offs mounted on the support member adjacent the signal producing means each being responsive to the reflective differences of the rotor surface and operative to develop an output signal therefrom, the pick-offs being in a plane perpendicular to the spin reference axis whereby rotor rotation with the spin axis coincident with the spin reference axis will effect output signals from the pick-offs in reference phase relation and whereby rotor rotation with the spin axis displaced with respect to the spin reference axis will effect output signals from the pick-offs displaced in phase from the reference phase in accordance with the degree of displacement between the axes and means connected to the pick-offs for measuring the phase displacement between the output signals.

3. In a gyroscopic apparatus, means for measuring relative angular displacements of the spin axis of a gyro rotor with respect to a spin reference axis and comprising a rotor support member defining a spin reference axis, a spherically shaped rotor rotatably supported by the support member and having a pair of hemispheres separated by an equator, the rotor having a spin axis extending through the center thereof and perpendicular to the plane defined by the equator, intelligence transmitting means on the spherical surface of the rotor including a plurality of pairs of intelligence transmitting areas, the transmitting areas defining arcs of great circles and of equal length on the spherical surface of the rotor longitudinally spaced equally from each other and inclined at a known oblique angle with respect to and bisected by the equator, first, second and third pairs of opposing pick-offs mounted on the support member with each pick-off being responsive to intelligence transmitted from a transmitting area on the rotor and operative to develop an output signal each time it receives intelligence therefrom, the pick-offs of each pair of the first and second pairs of pick-offs being located diametrically opposite each other with respect to the spin reference axis and defining two perpendicular axes located in a plane perpendicular to the spin reference axis, the third pair of pick-offs defining an axis coincident with the spin reference axis whereby when the rotor rotates about its spin axis in a given direction and the spin axis is coincident with the spin reference axis the output signals from the pick-offs of each of the first and second pairs of pick-offs will be coincident in phase and no output signal will be developed by the third pair of pick-offs and upon relative angular displacement of the spin axis with respect to the spin reference axis the output signals from the pick-offs of each pair of pick-offs will be displaced in phase by an amount determined by the amount of angular displacement between the spin axis and the spin reference axis, and means connected with the pick-offs for measuring the phase displacement between the output signals from the pick-offs of each pair of pick-offs and relating it to the relative angular displacement of the spin axis with respect to the spin reference axis.

4. In a gyroscopic apparatus, means for measuring relative angular displacements of the spin axis of a gyro rotor with respect to a spin reference axis and comprising a rotor support member defining a spin reference axis, a spherically shaped rotor rotatably supported by the support member and having a pair of hemispheres separated by an equator, the rotor having a spin axis extending through the center thereof and perpendicular to the plane defined by the equator, intelligence transmitting means on the spherical surface of the rotor including a plurality of pairs of light reflecting and non-light reflecting areas with the light reflecting areas being located between adjacent non-light reflecting areas, the non-light reflecting areas defining arcs of at least quadrants of great circles and of equal length and longitudinally spaced equally from each other on the spherical surface of the rotor and inclined at a known oblique angle with respect to the equator and bisected by the equator, means for applying light to the surface of the rotor, first, second and third pairs of opposing optical pick-offs mounted on the support member with each pick-off being responsive to light reflected from the surface of the rotor and operative to develop output signals indicative of changes in intensity of light received, the pick-offs of each pair of the first and second pairs of pick-offs being located diametrically opposite each other with respect to the spin reference axis and defining two perpendicular axes located in a plane perpendicular to the spin reference axis, the third pair of pick-offs defining an axis coincident with the spin reference axis whereby when the rotor rotates about its spin axis in a given direction and the spin axis is coincident with the spin reference axis the output signals from each of the first and second pairs of pick-offs will be coincident in phase and no output signal will be developed by the third pair of pick-offs and upon relative angular displacement of the spin axis with respect to the spin reference axis the output signals from the pick-offs of each pair of pick-offs will be displaced in phase by an amount determined by the amount of angular displacement between the spin axis and the spin reference axis, and means connected with the pick-offs for measuring the phase displacement between the output signals from the pick-offs of each pair of pick-offs and relating it to the relative angular displacement of the spin axis with respect to the spin reference axis.

5. Apparatus for monitoring the attitude of a body with respect to a gyroscopic reference comprising a substantially spherical rotor having a spin axis, free support means for supporting the rotor for rotation about the spin axis to establish the gyroscopic reference, a plurality of arcuate lines of uniform width and equal spacing inscribed on the surface of the spherical rotor and having a first optical reflectivity, the balance of the surface having a second optical reflectivity differing substantially from the first optical reflectivity, at least one pair of optical monitoring means disposed on the support means at diametrically opposite points with respect to the rotor, each of the optical monitoring means comprising means for directing an optical signal quantity toward the rotor surface and means for receiving the signal quantity as reflected from the rotor surface and modulated by the reflectivity variations arising from rotation of said surface relative to the optical monitoring means, means operatively connected with each of the optical monitoring means for converting the modulated optical signal quantity to a corresponding electrical signal quantity, and means operatively connected to the converting means for measuring the phase displacement between the electrical signal quantities from the pair of optical monitoring means as an indication of the attitude of the rotor with respect to the support means.

6. Apparatus for monitoring the attitude of a body with respect to a gyroscopic reference comprising a substantially spherical rotor, support means for freely supporting the rotor for rotation about a spin axis to establish the gyroscopic reference, the rotor having inscribed on the surface thereof a plurality of arcuate lines of uniform width and predetermined spacing and of an optical reflectivity differing substantially from the balance of the rotor, at least one pair of optical pick-offs disposed on the support means adjacent diametrically opposite locations on the surface of the rotor, each pick-off including means for directing a light signal toward the rotor surface and means for receiving a light signal reflected from the surface as modulated by reflectivity variations in the surface, and means operatively connected with the pair of pick-offs for measuring the phase difference between the modulated light signals received by the pair of pick-offs as an indication of the attitude of the rotor with respect to the support means.

7. Apparatus as defined in claim 6 further including second and third pairs of optical pick-offs disposed on the support means adjacent diametrically opposite locations on the rotor surface and along second and third diameters respectively which are mutually orthogonal and perpendicular to a diameter running through said one pair of pick-offs, and means operatively connected with each of the second and third pairs of pick-offs for measuring the phase difference between the two modulated signals received by each pair.

References Cited by the Examiner
UNITED STATES PATENTS 2,959,060   11/1960   Kunz _____ 74—5.6

FRED C. MATTERN, JR., *Primary Examiner.*

PALMER W. SULLIVAN, *Examiner.*

J. D. PUFFER, *Assistant Examiner.*